Oct. 19, 1965      W. HOLZER      3,213,217

PROGRAM DELAY CONTROL DEVICE

Filed Nov. 23, 1962      3 Sheets-Sheet 1

INVENTOR:
WALTER HOLZER

By Toulmin & Toulmin

Attorneys

Oct. 19, 1965

W. HOLZER 3,213,217

PROGRAM DELAY CONTROL DEVICE

Filed Nov. 23, 1962

INVENTOR
WALTER HOLZER

BY Toulmin & Toulmin

ATTORNEYS

United States Patent Office 3,213,217
Patented Oct. 19, 1965

3,213,217
PROGRAM DELAY CONTROL DEVICE
Walter Holzer, 19 Drosteweg, Meersburg
(Bodensee), Germany
Filed Nov. 23, 1962, Ser. No. 239,835
Claims priority, application Germany, Nov. 22, 1960,
H 41,012
5 Claims. (Cl. 200—38)

The present invention is a continuation-in-part application of my application Serial Number 153,996, filed November 21, 1961, now abandoned, and relates to a control apparatus or device wherein a timer operates a step switching device, which step switching device in turn operates upon a program device; the program device in turn may determine the duration of the next succeeding time interval.

For washing machines, for example, the program device is a motor driven cam disc moved in steps, and remaining in-between two succeeding steps for a duration respectively determined by the timer. Each disc position is associated with a particular operation or a combination of operations of and in the washing machine; thus in each position of the program disc there will be closed one or several program operating contracts actuating electrically controllable elements in the washing machine such as solenoid inlet and outlet valves, heater(s), washing motor, spining motor, couplings, etc.

The program operating contracts remain in operating position for a duration determined by the timer whereafter the program disc is moved by one step, is stopped, and another set of program operating contacts is being closed whereas all or some of the previously closed program operating contracts are being opened; also the program disc may open and close programmed timer contacts determining the duration of the next timer operation. Thus, there is an alternating operation of the timer and step switching device, and the program control disc remeans in operating position in-between two succeeding steps as respectively determined by the timer.

It is a primary object of the present invention to provide for a simple means for selectively skipping over several program portions or sections on the disc in having two or more steps follow each other immediately, i.e., in having the program control disc at will running continuously whereby those program operating contacts normally actuated by these program portions now to be passed over or skipped do not initiate any such operations in the washing machine.

According to one aspect of the present invention, in a preferred embodiment thereof, it is suggested to use a timer having a first zero position and a plurality of operating positions. In each of these operating positions a pair of contacts is connected for respectively completing a starter circuit for the drive of the step switching device moving the program disc in steps. During stepping i.e., after having started the step switching device to move the program disc by one step, the timer is recoiled to the first zero position. The timer furthermore actuates, i.e., closes a pair of enabling contacts governing all of the program operating contacts as controlled by the program disc. These enabling contacts are closed when the timer is in the first zero position and in any operating position.

The timer is capable of assuming a second zero position from which it is normally blocked, but whenever the step switching device is actuated for skipping, this blocking device is being overridden and the abovementioned recoiling device now places the timer into this second zero position wherein the pair of enabling contacts is being opened.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

FIG. 4 illustrates a sectional view through line IV—IV in FIG. 2.

Figure 1:
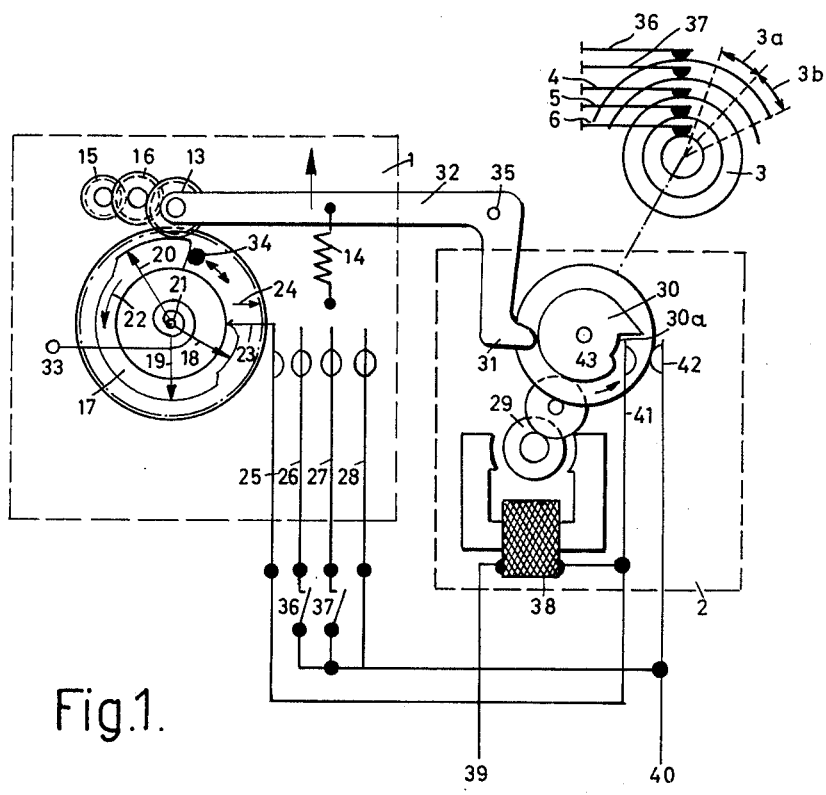
FIG. 1 illustrates schematically a timer with step switching program control apparatus at which the invention is to be employed.

Turning first to FIG. 1, reference numeral 1 denotes the timer in general and may be referred to as the timing means, whereas the dotted box 2 denotes a self-interrupting motor controlled step switching arrangement or sequencing means operating upon a program disc 3 which in turn cooperates with program contacts 4, 5 and 6 performing switching operations within the washing machine in accordance with the program defined by the cam tracks on disc 3. Cam disc 3 is to be moved in steps so as to place program sections 3a, 3b, etc., successively into the operating range of programmed timer contacts 36, 37, and program operating contacts 4, 5, 6.

Proceeding first to the description of the timer, there is shown schematically a constant speed motor 15 driving an intermediate gear 16 which in turn meshes with a gear wheel 13. Gear wheel 13 drives a timer disc 17 having a plurality of cams defined by successively increasing radial distances 18, 19, 20 from axis 21; increasing being understood in relation to a feeler arm 23 when disc 17 rotates in the direction 22.

The feeling arm or lever 23 scans the said cams and upon rotation of disc 17 this lever 23 is deflected stepwise in the direction 24. Since rotation of disc 17 is carried out at a constant speed, the stepwise movements of lever 23 occur accurately at predetermined times measured from the starting of the timer from the position shown.

The stepwise movement of feeler 23 results in a correspondingly successive closing of contact pairs 25–26–27 and 25–27–27–28, respectively. These are the operating contacts of the timer. The contact blades 26 and 27 are respectively connected in series with switching contacts 36 and 37, which may either be operated on manually or they may also be operated on by program disc 3. Presently, they are assumed to be operated upon by the program disc 3, and they are, therefore, programmed contacts for the timer to respectively govern effectiveness of contact pairs 25–26 and 26–27.

Depending upon which one of the programmed timer contacts 36 and 37 is being closed, there is defined a preparatory starting circuit for motor 29. When contact 36 is closed, a field winding 38 is connected to voltage source terminals 39 and 40 as soon as the cam with radius 18 has urged lever 23 so as to close contacts 25 and 26. If contact 36 is open but contact 37 is being closed, the field winding 38 will not be energized until the timer disc 17 has rotated sufficiently far so that cam portion with radius 19 urges feeling lever 23 to close contacts 25–26–27. If none of the contacts 36 and 37 is closed, the field winding 38 will not be energized until cam portion with radius 20 urges lever 23 to close all contacts 25–26–27–28.

Thus, there are defined time-dependently operated starter circuits for motor 29.

As soon as motor 29 is being started, a cam 30 starts to rotate and performs two functions. First, it closes a pair of contacts 41 and 42 bridging the operating and the programmed timer contacts 25 to 28 and 36, 37, respectively, so that field winding 38 remains energized and motor 29 continues to run regardless what happens to the aforesaid timer contacts.

The second function of cam 30 is carried out by its engaging projection 31 of a two-arm lever 32 having a pivot point at 35 and being spring biased so that projection 31 positively engages cam 30. When cam 30 is rotating, it pushes projection to the left so that lever 32 rotates or pivots in clockwise direction. The other arm of lever 32 supports gear wheel 13, and when lever 32 pivots in clockwise direction, gear wheel 13 is placed out of engagement with cam 17.

Cam 17 was biased by a spring 33 and this spring 33 was being tensioned when cam disc 17 was driven by gear wheel 13 in direction 22 during the previously described timer operation. When gear wheel 13 disengages from disc 17, the spring 33 recoils cam disc 17 until it engages stop pin 34. During recoiling and upon completion thereof, contacts 25 to 28 open successively at the inverse succession of actuation, and as soon as disc 17 abuts stop pin 34 all contacts 25 to 28 are open. However, since contacts 41 and 42 now referred to as key contacts have been closed after motor 29 was being started, the opening of the contacts 25 to 28 does not affect the energization of field winding 38.

Motor 29 continues to run until cam 30 has completed one revolution, whereupon the cutout 30a of cam 30 opens contacts 41, 42 and stops motor 29. Thus, one step is defined by moving disc 3 from program section to program section, while cam 30 performs one complete revolution. Substantially simultaneously, spring 14 has returned lever 32 counterclockwise so that gear 13 engages cam disc 17 anew.

During the rotation of motor 29, the program disc 3 has rotated by one step, and another program section thereof affects a new combination taken from the contacts 4, 5, 6, 36, 37, while some or all contacts previously closed are now being open, This, of course, depends upon the configuration of program disc 3. Since gear 13 has engaged again cam disc 17, the time cycle is started anew, and after a predetermined time interval motor 29 is started, performs another step, etc.

The initial timer position is defined by the position of pin 34, which is stationary for purposes of the alternating timer and step switching operation as aforedescribed. It is possible, however, to render pin 34 independently pivotable and arrestable in an alternative position. It will be appreciated, that this adds or subtracts a constant period of time to any of the timer intervals as determinable by the timer disc 17. Particularly in pivoting pin 34 for a fixed distance in clockwise direction, there will be added a particular period of delay before cam or lever 23 is deflected to the right (arrow 24). How such delay can be employed in a more sophisticated device will become more apparent from the following description of FIGS. 2, 3 and 4.

Figure 2:
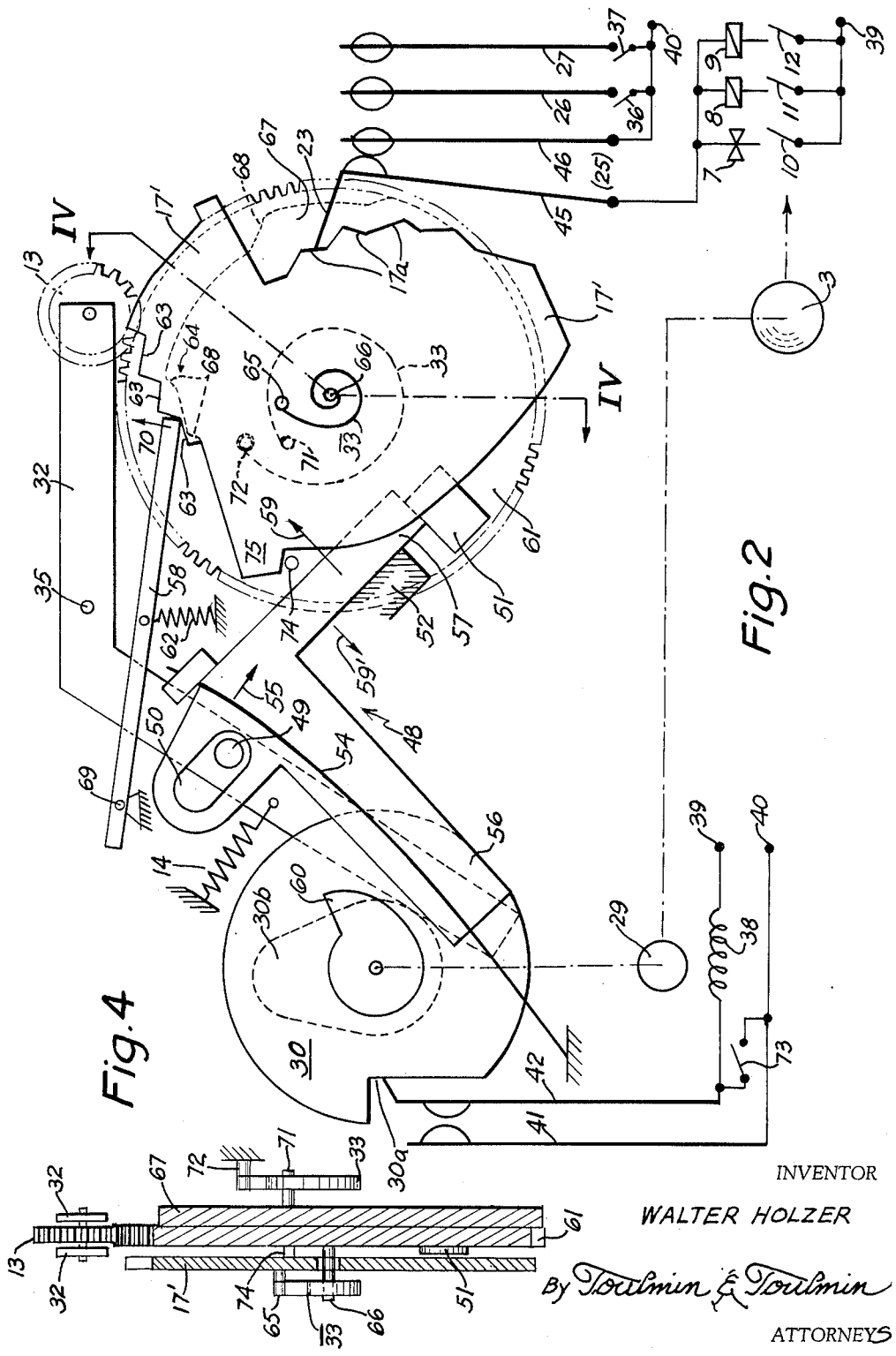
FIG. 2 illustrates an embodiment in side elevation with partially broken open view wherein the timer is in the above-defined first zero position.

In FIG. 2, like reference numerals denote elements of similar function as compared with FIG. 1, however, some elements have been omitted. The timer assembly in FIG. 2 is comprised of a first gear wheel 61 meshing during normal timer operation with gear wheel 13. There is a release cam disc 67 mounted on wheel 61, or being integral therewith and, of course, rotating therewith. Cam disc 67 has a number of shoulders 68 defining a plurality of succeeding cams with successively increasing radius. These cams and shoulders 68 now define the various time intervals derivable from this timer. The assembly 61–67 has an axial pin 66 upon which is loosely seated a timer cam disc 17'. This cam 17' has first a number of steps 63 and a further plurality of cams 17a engaging feeler lever 23 as aforedescribed.

There is a lever 58 biased by means of a spring 62 in a direction urging its right hand arm towards and onto steps 63. The right arm or arm portion of lever 58 is actually designed as a fork in this embodiment, with two prongs receiving inbetween wheel 61. One prong end cooperates with cam 17' on steps 63 and the other prong rests on shoulders 68 of cam 67. It is pointed out, however, that in case cams 17' and 67 are juxtaposed this lever 58 can have one broad arm resting on both cams 17' and 67.

More particularly, this right hand lever arm rests on the first step 63, while shoulders 68 of cam 67 are capable of lifting this lever arm against the tension of spring 62 in direction of arrow 70. Lever 58 is pivoted by 69, and for all practical purposes here it is a one-arm lever.

Cam disc 17' is resiliently connected to assembly 61–67 by way of a spring 33 engaging both, an eccentrically positioned lug 65 on disc 17 and the axial pin 66 pertaining to the assembly 61–67.

Wheel 61 is provided with a stop member 51 capable of resting against the front face of arm 57 of a lever 48. A second spring 33 is provided as aforedescribed to recoil wheel 61. There is an eccentric pin 71 on cam 67 and a stationary pin 72 for respectively supporting the ends of recoiling spring 33.

It will be observed, that FIG. 2 illustrates a zero position for the timer, which was defined above as the first zero position but feeling lever 23 is actually in its first contact operating position. The purpose thereof is to have a pair of enabling contacts 45 and 46 closed. It can be seen, that this pair of contacts enables contacts 10, 11 and 12 to respectively activate solenoid valve 7 and control relays 8 and 9. Contacts 10, 11 and 12 are considered program contacts operated upon by program disc 3. Such can be carried out either directly, i.e., contacts 10, 11 and 12 are then to correspond to contacts 4, 5 and 6 of FIG. 1, or the latter contacts energize relays which in turn govern contacts 10, 11, 12. This is a matter governed by the power requirements of the elements 7, 8 and 9.

Closing of enabling contacts 45 and 46 is a prerequisite of the effectiveness of program operating contacts 10, 11, 12. During normal timer operation these contacts 45 and 46 are being closed permanently.

The cam assembly 30 in this embodiment is more involved. There is first the cutout 30a similar to that of FIG. 1, operating upon contacts 41 and 42 as aforedescribed. Cam 30 is driven by motor 29. The energizing field winding 38 which is shown here schematically only is in circuit with contacts 41, 42. This motor 29 is being started by closing of contacts 25, 26, 27, etc., also as aforedescribed.

Cam assembly 30 has a second cam 30b capable of engaging one arm of lever 32 so as to pivot it, counterclockwise against the tension of the spring 14 so as to place gear wheel 13 out of engagement from gear wheel 61, also as aforedescribed. Since zero position is shown, gear wheel 13, of course, engages wheel 61. The illustrated position is also one, in which motor 29 is not running (contacts 25, 26, 27, etc., and contacts 41, 42 being open).

There is another cam 60 pertaining to cam assembly 30, running therewith, and being capable of engaging lever arm 56 of lever 48 for pivoting the latter counterclockwise about pivot 49 on lever 32. Lever 48 is, furthermore, biased by a spring 54 urging this lever 48 in a clockwise direction indicated by arrows 55 and 59'. In the illustrated position lever 48 cannot move in the direction 59' because it engages a stop 52, which is stationary, whereas stop 51 on gear wheel 61 prevents movement of lever 48 in direction of arrow 55.

The contacts 41 and 42 can be overbridged by a switch 73, which switch, however, remains open and, thus, ineffective during normal timer operation. This normal timer operation will now be described in the following: The normal operation starts out from the position of all the elements relative to each other as is shown in FIG. 2. Thus, gear wheel 13 engages wheel 61, and lever 58 rests on the first step 63. Wheel 61 is now rotated counterclockwise (arrow 64) against the increasing tension of springs 33 and $\overline{33}$. Since lever 58 engages cam 17' at the flank of the second step 63, cam 17' is hindered from following this rotation. However, when the first shoulder 68 of cam 67 lifts lever 58 to the next step 63 on cam 17', there results a first rapid follower rotation of cam 17' in direction of arrow 64 due to partial recoiling of spring $\overline{33}$, causing contacts 25 and 26 rapidly to close. This is an important feature, since the closing of the timer operated contacts is not carried out at the slow motion of the timer assembly 61–67, but rapidly at the rate of the follower motion of cam 17' upon partial recoiling of spring $\overline{33}$.

Wheel 61 with cam 67 continue to rotate, but cam 17' is hindered again from following at first, until the next shoulder 68 of cam 67 lifts lever 58 upon the next (now the third) step 63, and again spring $\overline{33}$ recoils partially and causes cam 17' to rotate counterclockwise by another short step until lever 58 engages the flank of the next (fourth) step 63; contacts 26 and 27 have now been closed.

Timer action is determined here by the time intervals elapsing between succeeding lifting steps by the angularly displaced shoulders 68 of cam 67, lifting lever 58 and thus controlling the occurrence of rapid timer-switching operations of cam 17'.

The procedure continues, until a preparatory or starter circuit for motor 29 is present (contact 36 or 37 being closed).

When the timer assembly, particular wheel 61 was first reeled out of the first zero position of the timer as is shown in FIG. 2, spring 54 has immediately urged lever 48 into the direction of arrow 55, thus, placing pivot 49 into the upper part of slot 50 and actually placing lever arm 56 substantially out of arm reach of cam 60. Of course, during timer operation, cam assembly 30 remains in the position illustrated but placing lever arm 56 out of the reach of cam 60 during timer operation has its reason which will be understood from the following:

After motor 29 has been started as aforedescribed upon completion of timer operation, there will be performed one step accompanied by the following events.

Cam 30b will start to rotate clockwise and soon will engage lever 32 for pivoting it counterclockwise. This is possible since after the timer had started to run, pivot 49 was in the upper part of slot 50 because lever 48 was being moved in direction of arrow 55; hence, the counterclockwise pivoting of lever 32 is possible because pivot 49 is permitted to move in the slot 50.

Rotating cam 60 does not affect lever arm 56 when lever 48 has been moved down in direction of arrow 55 as described, so that lever 48 is not pivoted in direction of arrow 59. The disengagement of wheel 13 from wheel 61 upon the pivoting of lever 32 results in the following:

Since the partial recoilings of spring $\overline{33}$ in counterclockwise advancing cam 17' (arrow 64) did not remove the tensioning of spring $\overline{33}$ completely, and since cam 17' is still stopped by lever 58 to follow wheel 61 completely in the counterclockwise direction of arrow 64, discs 61 and 67 when disengaged from 13 can return clockwise, by corresponding clockwise recoiling of spring $\overline{33}$ but not completely.

For returning the assembly 61–67–17' there is the spring 33 which was tensioned also by wheel 61 and cam 67 when moving out of the zero position in counterclockwise direction during timer operation. The stepwise recoiling of spring $\overline{33}$ for causing cam 17 to follow did not affect this spring 33. Only when cam 30b disengages wheels 13 and 61 from each other, wheel 61 with cam 67 is being recoiled in clockwise direction by spring 33. Cam 17' is following this clockwise movement to the first zero position because a pin 74 on wheel 61 engages projection 75 on cam 17, urging it to follow the recoiling of spring 33 as being effective on wheel 61. Lever 58 impairs only counterclockwise movements of cam 17', and thus does not prevent cam 17' from the clockwise return movement.

When stop 51 on wheel 61 engages the end face of lever arm 57, the latter is urged back thereby into the position of FIG. 2, i.e., oppositely to arrow 55; recoiling spring 33 overcomes the tension of spring 54. Spring 33 cannot urge stop 51 to move arm 57 further back since this is stopped by pivot 49 then in lower position of slot 50, and lever 32 cannot be pivoted around 35 clockwise out of the position shown in FIG. 2.

After return to the first zero position as shown in FIG. 2, wheel 13 has, in fact, re-engaged wheel 61, and the rotary movement of the latter is again reversed and proceeds counterclockwise (64) and another timer cycle is started. Immediately thereafter, lever 48 is moved in direction of arrow 55 again, to be returned into the position of FIG. 2 after completion of the said other timer cycle.

It will be observed, that the timer operates out of the first zero position of FIG. 2 in counterclockwise direction 64, and back into this zero position whenever motor 29 has been started. Thus, contacts 45 and 46 remained closed all the time. It will further be observed, that for every stem cam assembly 30 performed precisely one revolution and then stopped in the position shown in FIG. 2, contacts 41 and 42 being open, motor 29 unenergized. This is important, because otherwise no new timer cycle could start. The timer moves slow while assembly 30 rotates fast. The timer assembly 61–67 can actually move effectively out of the zero position only if drive 29 has stopped, because every passage of cam 30b at lever 32 initiates recoiling of the timer into the first zero position.

In the following it will be described how it can be effected, that more than one step in immediate succession is being carried out while the timer does not start, and while the program disc 3 does not perform any switching operation. Since the immediate succession of two or more steps is carried out for skipping certain program sections of the normally stepwise moved program disc 3, this shall be called skipping and is carried out as follows:

First of all, switching contact 73 is closed, causing motor 29 to start; whatever timer operation or cycle is in the process of being interrupted, since starting of motor 29 causes lever 32 to pivot. Gear wheel 13 disengages from wheel 61 so that the timer assembly is being recoiled by spring 33 as aforedescribed into the position shown in FIG. 2.

Figure 3:
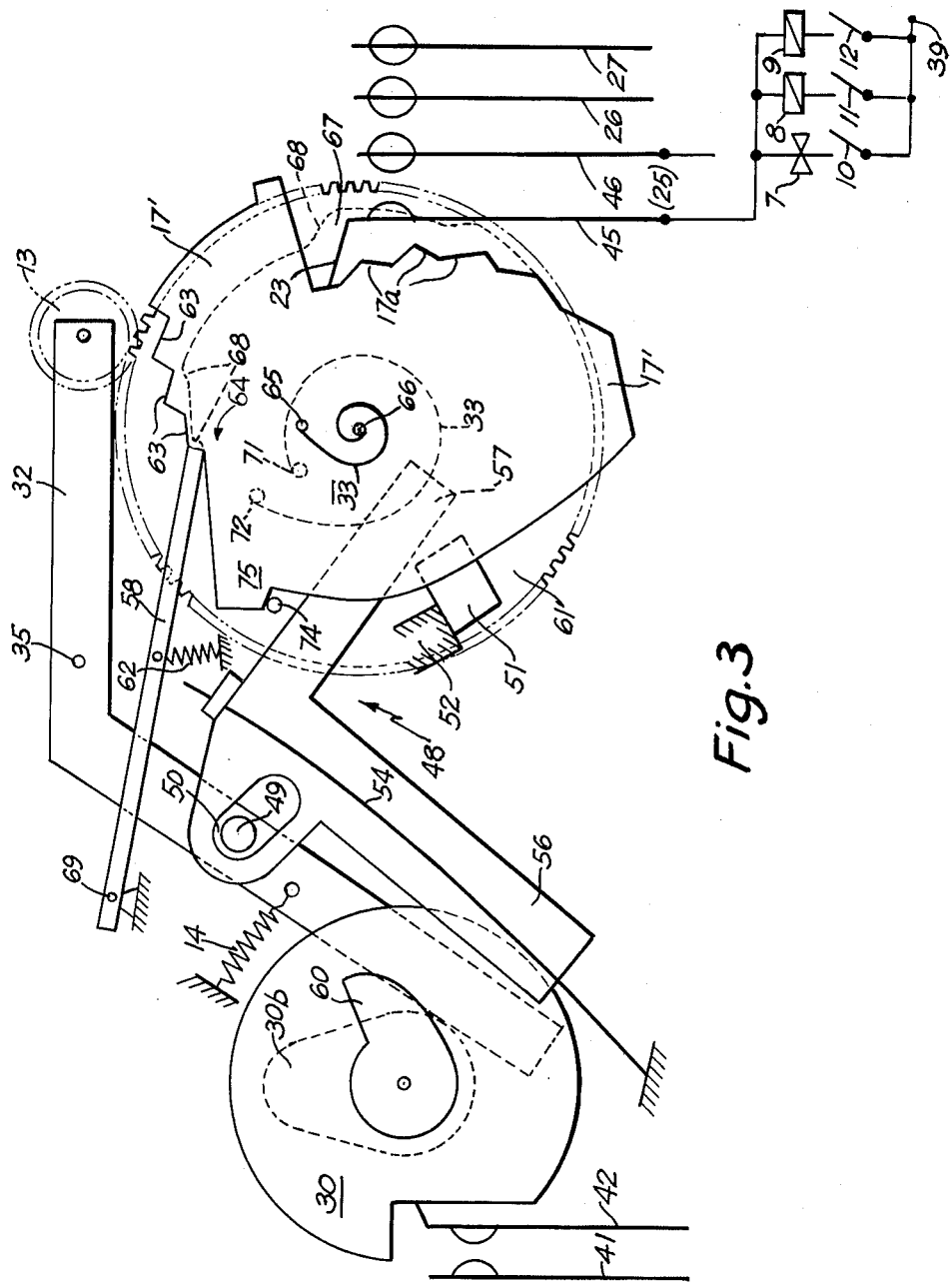
FIG. 3 illustrates the same embodiment as is shown in FIG. 2, but with the timer being in the said second zero position.

Now, however, the motor 29 is not stopped when the position shown in FIG. 2 is being attained, because the opening of contacts 41, 42 is ineffective due to switch 73 being closed, and cam assembly 30 continues to rotate. Since the timer is still in the first zero position (FIG. 2) lever 48 remains in the position shown in FIG. 2 while cam assembly 30 continues to rotate, which means that now cam 60 can reach lever arm 56 so as to pivot lever 48 counterclockwise about pivot 49 and particularly arm 57 moves in the direction of arrow 59. This has three effects: (a) spring 33 can recoil discs 61, 67 and 17' clockwise still further until stop 51 on disc wheel 61 abuts stationary stop 52 (FIG. 3); (b) enabling contacts 45 and 46 are now opened. Thus, whatever switching operation is carrier out, contacts 10 to 12, during the continued rotation of program disc 3 remain ineffective. (c) The disengagement of lever arm 57 from stop 51 permits spring 54 to move lever 48 in the direction of arrow 55 and correspondingly, pivot 49 is again placed in the upper portion of slot 50 so that correspondingly lever 32 is not inhibited from pivoting counterclockwise. This is important, so that no timer cycle is being commenced during skipping.

FIG. 3 illustrates the position thus obtained which is the second zero position.

During skipping, lever 48 is in the position shown in FIG. 3 and cam assembly 30 rotates so that cam 30b resets the timer continuously, thus lever 32 must be pivotable freely about pivot 35 which condition is ensured if lever 48 is in this position, since now pivot 49 can slide unimpaired in slot 50 so that lever 32 can be pivoted back and forth. Whenever wheel 13 rotates and engages gear wheel 61, the latter is rotated slightly but cam 17' remains in zero position of FIG. 3 since level 58 engages the flank of the step 63 preventing cam 17' from following wheel 61. During skipping, cam 30b in rapid succession pivots lever 32 back and forth; during the short periods of time in which cam 30b is disengaged from lever 32, the timer wheel 61 rotates only slightly counterclockwise and at a distance insufficient to place a first shoulder 68 under lever 58 for lifting it. Upon pivoting of lever 32, gear 13 disengages temporarily, and wheel 61 with cam 67 is returned by recoiling of spring 33. Thus, wheel 61 oscillates back and forth out of and into the second zero position but never quite reaching the first zero position before being recoiled due to the rapid rotation of cam assembly 30 as compared with the slow timer motion as transmitted from gear 13 to wheel 61. This is repeated as long as (a) contacts 41 and 42 are overbridged by contact 73; (b) lever 48 is in the position of FIG. 3; (c) wheel 61 together with cam 67 are recoiled by spring 33, before any of the shoulders 68 of cam 67 can lift lever 58 up onto the first step 63.

Skipping is terminated by opening of contact switch 73 causing motor 29 to stop at a position of cam assembly 30 shown in both FIG. 2 and FIG. 3. The timer itself then is still in the zero position shown in FIG. 3 which means that for the next timer cycle the timer is being started at a slight delay until the very first shoulder 68 has lifted lever 58 upon the first step 63, and the first zero position of FIG. 2 is then being attained. Since spring 54 actually urges the lever 48 into direction of arrow 55 as well as arrow 59', lever 48 also returns into the position of FIG. 2, after the timer has been rotated from the second into the first zero position. Stop 51 on wheel 61 has moved away from stop 52 as well as from lever arm 57. Now normal timer operation can resume with alternating timer and step switching operation as aforedescribed, with FIG. 2 again defining the zero position, and enabling contacts 45 and 46 being and remaining closed.

It will be observed, that lever 48 serves as a blocking device which during normal timer operation moves back and forth in direction of arrow 55 and oppositely thereto, but never permitting timer assembly 61–67–17' to recoil clockwise further than into the first zero position of FIG. 2. The timer operating positions are all counterclockwise displaced from the first zero position. Commencing skipping, the cam 60 pivots lever 48 so as to move arm 57 thereof out of the reach of stop 51, so that actually, the cam assembly 30 causes the blocking to be overridden and timer recoiling spring 33 places the timer from the first zero position clockwise into the second zero position; the enabling contacts 45, 46 governing the program operating contacts 10, 11, 12 are being disabled.

The invention is not limited to the embodiments described above but all changes and modifications thereof not constituting departures from the spirit and scope of the invention are intended to be covered by the following claims.

What is claimed is:

1. In a process controller, a plurality of contacts connected by electric conductors to process initiating means, sequencing means interconnected to said contacts by cam disks and automatically operating said contacts according to a predetermined program, timing means including a gear wheel and a timer cam carried thereby and rotating therewith, gear means driving said gear wheel in a given direction by a constant speed motor, said timing means controlling undirectional driving means for said sequencing means, a second plurality of contacts connected to said driving means by means of electric conductors and operable by said cam disk of said timer, means for skipping selectable parts of said program by discontinuing automatic operation of said timing means, such means including medially pivoted lever means with one end operatively engaging said cam means and the other end carrying said gear means and further including a pair of key contacts connected to said driving means in parallel with said second plurality of contacts, said key contacts being operable manually; means controlling said driving means to cyclically return said cam means to a neutral position, said last named means comprising cam-controlled self-disengaging contacts which are connected by electrical conductors with the driving mechanism completing one step of said sequencing means; and means for returning said timing means to its initial position following such completion.

2. The invention as defined in claim 1, and including means rapidly closing said second plurality of contacts in series one at a time at predetermined time intervals, said interval being before each additional contact.

3. The invention as defined in claim 1, said timer cam being resiliently mounted on one side of said gear wheel.

4. The invention as defined in claim 1, said timing means also having a release cam rigidly mounted on said gear wheel, spring drive between said timer cam and gear wheel means arresting the rotation of said timer cam for predetermined step period during rotation of said gear wheel, each of said periods being determined by said release cam, said release cam operating to render the arresting means inaffective whereby the timer cam rapidly moves one step under the influence of said spring.

5. The invention as defined in claim 1, wherein the means for returning said timing means to its initial position is a spring means for disengaging said gear means from said gear wheel permitting said spring to operate to return the timing means to its said initial position.

References Cited by the Examiner
UNITED STATES PATENTS

| | | | |
|---|---|---|---|
| 1,800,381 | 4/31 | Geiger | 200—38 |
| 2,870,834 | 1/59 | Sisson | 200—38 |
| 3,023,282 | 2/62 | Blakeslee et al. | 200—38 |

BERNARD A. GILHEANY, *Primary Examiner.*